US008134827B2

(12) United States Patent
Umemoto et al.

(10) Patent No.: US 8,134,827 B2
(45) Date of Patent: Mar. 13, 2012

(54) SOLID ELECTROLYTIC CAPACITOR HAVING THERMAL COMPENSATION

(75) Inventors: Takashi Umemoto, Moriguchi (JP); Hiroshi Nonoue, Moriguchi (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 678 days.

(21) Appl. No.: 12/275,426

(22) Filed: Nov. 21, 2008

(65) Prior Publication Data
US 2009/0135550 A1 May 28, 2009

(30) Foreign Application Priority Data

Nov. 26, 2007 (JP) .................. 2007-304155

(51) Int. Cl.
*H01G 4/228* (2006.01)
*H01G 9/10* (2006.01)
*H01G 9/00* (2006.01)
*H05K 5/03* (2006.01)

(52) U.S. Cl. ...................... 361/538; 361/523
(58) Field of Classification Search .................. 361/538, 361/535, 523
See application file for complete search history.

(56) References Cited

U.S. PATENT DOCUMENTS

| 4,001,655 A * | 1/1977 | Voyles et al. ................. 361/534 |
| 6,229,688 B1 * | 5/2001 | Kobayashi et al. ........... 361/523 |
| 6,529,366 B2 * | 3/2003 | Nakamura .................... 361/523 |
| 6,552,896 B1 * | 4/2003 | Igaki et al. .................... 361/523 |
| 6,845,004 B2 * | 1/2005 | Melody et al. ................ 361/538 |
| 2006/0221556 A1 * | 10/2006 | Naito ............................ 361/540 |

FOREIGN PATENT DOCUMENTS

| JP | 01140621 A | * | 6/1989 |
| JP | 03292716 A | * | 12/1991 |
| JP | 05-136009 A | | 6/1993 |
| JP | 08-148392 A | | 6/1996 |

* cited by examiner

*Primary Examiner* — Eric Thomas
*Assistant Examiner* — David M Sinclair
(74) *Attorney, Agent, or Firm* — Marvin A. Motsenbocker; MOTS Law, PLLC

(57) ABSTRACT

An aspect of the present invention provides a solid electrolytic capacitor that comprises: an anode mainly formed of a valve metal or an alloy thereof; an anode lead terminal a part of which is buried in a side surface of the anode; a dielectric layer formed on surfaces of the anode and mainly formed of an oxide; a conducting polymer layer formed on the dielectric layer; a cathode layer formed on the conducting polymer layer on an outer circumferential surface of the anode, the cathode layer comprising: a carbon layer; and a silver paste layer formed on the carbon layer; a thermal expansion layer provided on the side surface of the anode and on a part of the outer circumferential surface continuing from the side surface; and a rein outer package provided to cover the anode, dielectric layer, cathode layer, and thermal expansion layer, wherein a thermal expansion coefficient in a temperature range lower than a glass transition temperature of the thermal expansion layer is larger than that of each of the silver paste layer and the resin outer package.

14 Claims, 4 Drawing Sheets

SOLID ELECTROLYTIC CAPACITOR HAVING THERMAL COMPENSATION

CROSS REFERENCE TO RELATED APPLICATIONS

This application claims priority based on 35 USC 119 from prior Japanese Patent Application No. P2007-304155 filed on Nov. 26, 2007, entitled "Solid Electrolytic Capacitor", the entire contents of which are incorporated herein by reference.

BACKGROUND OF THE INVENTION

1. Field of the Invention

The present invention relates to a solid electrolytic capacitor using a valve metal or an alloy thereof as an anode.

2. Description of the Related Art

There has been known a solid electrolytic capacitor including: an anode formed of a valve metal or an alloy thereof; and a metal oxide layer formed as a dielectric layer on the surface of the anode by anodizing the anode in a phosphoric acid solution or the like. An electrolyte layer formed of manganese dioxide or the like is formed on the dielectric layer thus formed by the anodization. However, there has been a problem that an equivalent series resistance (ESR) becomes large because the conductivity of manganese dioxide is smaller than that of a metal or the like. Accordingly, it has been proposed that an ESR is reduced by using a conducting polymer as an electrolyte layer in place of manganese dioxide.

However, in the solid electrolytic capacitor using a conducting polymer as an electrolyte layer, there has been a problem of decreasing capacitance when the solid electrolytic capacitor is preserved under high temperature.

Japanese Patent Application Publication No. Hei 5-136009 proposes that a buffer layer formed of a low stress resin is provided inside a resin outer package in order to alleviate mechanical stress caused by contraction of the resin outer package when the resin outer package, which is formed for sealing the entire device, is molded. However, since such a buffer layer is used for alleviating the mechanical stress when the resin outer package is molded, the decrease in capacitance of the solid electrolytic capacitor preserved under high temperature cannot be suppressed by the buffer layer.

In addition, Japanese Patent Application Publication No. Hei 8-148392 proposes that a buffer material is provided on a surface of a device, facing the gate of the mold, in order to protect the device from mechanical shock due to injection pressure when a resin is molded. However, this buffer material is also for alleviating the mechanical shock when a resin compact is molded, and thus cannot suppress the decrease in the capacitance of the solid electrolytic capacitor preserved under high temperature.

SUMMARY OF THE INVENTION

An aspect of the invention provides a solid electrolytic capacitor that comprises: an anode, which is mainly formed of any one of a valve metal and an alloy thereof; an anode lead terminal a part of that is buried in a side surface of the anode; a dielectric layer which is formed on surfaces of the anode and is mainly formed of an oxide; a conducting polymer layer that is formed on the dielectric layer; a cathode layer that is formed on the conducting polymer layer corresponding to an outer circumferential surface of the anode, the cathode layer comprising: a carbon layer; and a silver paste layer that is formed on the carbon layer; a thermal expansion layer that is provided on the side surface of the anode as well as on the conducting polymer layer corresponding to a part of the outer circumferential surface continuing from the side surface; and a resin outer package provided so as to cover the anode, the dielectric layer, the cathode layer, and the thermal expansion layer, wherein a thermal expansion coefficient in a temperature range lower than a glass transition temperature of the thermal expansion layer is larger than a thermal expansion coefficient in a temperature range lower than a glass transition temperature of each of the silver paste layer and the resin outer package.

In the above-described embodiment, the cathode layer is provided so that the conducting polymer layer would be exposed in the side surface of the anode and a part of the outer circumferential surface continuing from the side surface, and the thermal expansion layer is provided so that the conducting polymer layer would come in contact with the exposed portion. This thermal expansion layer has thermal expansion coefficient $\alpha1$, which is larger than thermal expansion coefficient $\alpha1$ of each of the silver paste layer and the resin outer package.

The inventors of the present invention have studied the cause of the decrease in capacitance in a conventional solid electrolytic capacitor when preserved under high temperature. As a result, it is found that an amount of moisture in the conducting polymer layer is reduced by the solid electrolytic capacitor preserved under high temperature, which causes great contraction of the conducting polymer. For this reason, the dielectric layer and the conducting polymer layer separate from each other, and thus the capacitance of the solid electrolytic capacitor is decreased.

Providing the above-described thermal expansion layer so as to come in contact with a portion where the conducting polymer layer is exposed enables reduced stress from the conducting polymer layer because the thermal expansion layer expands if the conducting polymer layer is contracted when the solid electrolytic capacitor is preserved under high temperature. Thus, the separation of the conducting polymer layer from the dielectric layer can be suppressed, and the decrease in capacitance when the solid electrolytic capacitor is preserved under high temperature can be thereby suppressed.

Here, it is preferable that the thermal expansion layer be provided so as to entirely cover the portion where the conducting polymer layer is exposed. Providing the thermal expansion layer so as to entirely cover the exposed portion, the decrease in capacitance can be more effectively suppressed. In addition, it is preferable that thermal expansion coefficient $\alpha1$ of the thermal expansion layer be equal to or larger than $30 \times 10^{-6}/°$ C. Setting thermal expansion coefficient $\alpha1$ to such a range, the decrease in capacitance can be more effectively suppressed. In the present invention, it is preferable that the glass transition temperature of the thermal expansion layer be equal to or less than 100° C. When the glass transition temperature of the thermal expansion layer is equal to or less than 100° C., thermal expansion coefficient $\alpha2$ (a thermal expansion coefficient in a temperature range higher than the glass transition temperature) that is generally larger than thermal expansion coefficient $\alpha1$ becomes dominant when the solid electrolytic capacitor is preserved under high temperature exceeding 100° C. Thus, the stress from the conducting polymer layer can be more effectively reduced and the separation of the conducting polymer layer from the dielectric layer can be suppressed. Consequently, the decrease in capacitance when the solid electrolytic capacitor is preserved under high temperature can be further effectively suppressed.

The largest value of expansion coefficient α1 is not particularly limited. In general, the largest value thereof is $10000 \times 10^{-6}/°C$.

Here, the material of the thermal expansion layer is not particularly limited as long as it can be provided so as to come in contact with the exposed portion of the conducting polymer layer, and thermal expansion coefficient α1 of the thermal expansion layer is larger than that of each of the silver paste layer and the resin outer package. For example, a resin can be preferably used as the thermal expansion layer. Such a resin includes an epoxy resin, a silicone resin, a urethane resin, and a fluorine resin.

The thermal expansion layer can be formed by using, for example, a resin composition in which a filler is contained in the above-described resin. If the filler is contained, thermal expansion coefficients α1 and α2 can be adjusted by the content of the filler. In general, when the content of the filler is increased, the thermal expansion coefficient is decreased. In contrast, when the content of the filler is decreased, the thermal expansion coefficient is increased.

The method for forming the thermal expansion layer can be selected depending on a material to be used. For example, in the case of a liquid resin containing a filler, such as silica or alumina, the thermal expansion layer can be formed by applying and then drying the liquid resin.

It is preferable that the anode be formed of a material containing a valve metal or an alloy thereof. The valve metal includes a metal, such as niobium, tantalum, titanium, and aluminum. In addition, the alloy which is mainly formed of a valve metal includes an alloy which is formed of these metals. Alternatively, the anode may be formed of an oxide of these metals, such as niobium monoxide. The anode is preferably formed of niobium or an alloy mainly formed of niobium or niobium monoxide. By using these materials as an anode material, the permittivity of the dielectric layer can be increased more than the case where the anode is formed of tantalum. Thus, a high-capacity solid electrolytic capacitor with excellent leakage current characteristics and reliability characteristics can be obtained.

In the present invention, the dielectric layer can be formed by, for example, anodizing an anode in a phosphoric acid solution or the like.

The conducting polymer layer can be formed of poly (3,4-ethylenedioxythiophene), polypyrrole, polythiophene, polyaniline, or the like. The method for forming the conducting polymer layer includes a chemical polymerization method and an electrolytic polymerization method. The carbon layer can be formed by applying a carbon paste or the like, and the silver paste layer can be formed by applying a silver paste or the like.

The material of the resin outer package is not particularly limited as long as it can be used for sealing the solid electrolytic capacitor. For example, a thermosetting resin composition which is generally used as a sealant for electronic parts can be used. The thermosetting resin composition used as a sealant generally includes a resin, a filler, a curing agent, an accelerator, and a flexible material. An epoxy-based resin is preferably used as a resin. If an epoxy-based resin is used as a resin, for example, a silica particle is used as a filler, a phenolic resin is used as a curing agent, an imidazole compound is used as an accelerator, and a silicone resin is used as a flexible material.

DETAILED DESCRIPTION OF THE PREFERRED EMBODIMENT

Figure 1:
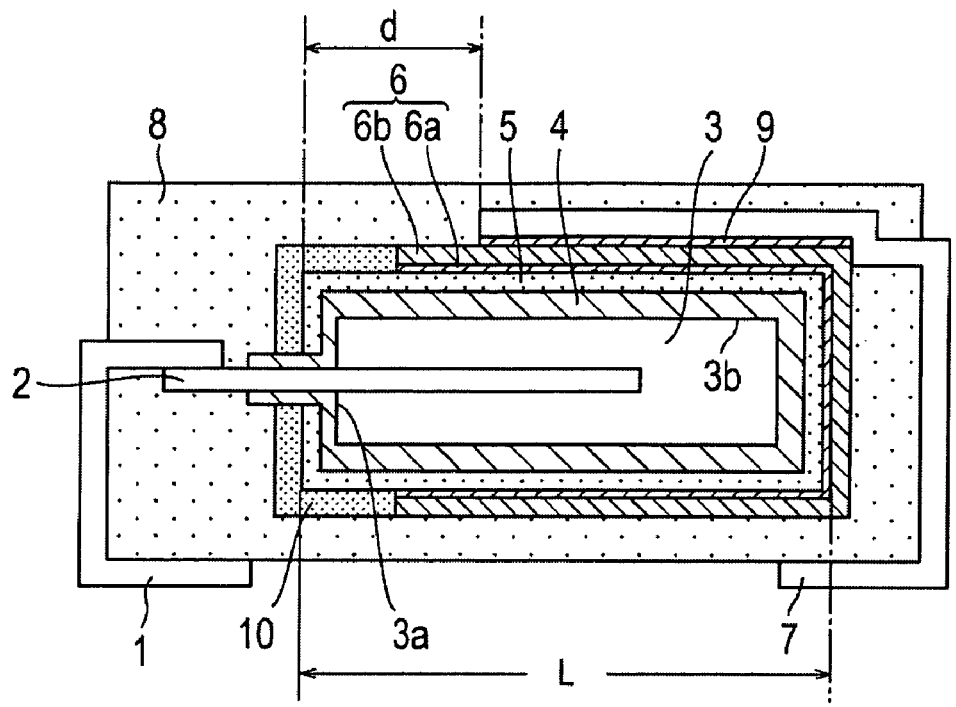
FIG. 1 is a schematic cross-sectional view showing a solid electrolytic capacitor according to Example 1.

An embodiment of the invention will be described below by referring to the drawings. However, shapes, sizes, and positional relationships of respective components are merely schematically shown to an extent that the invention would be understood. In addition, the preferred embodiment will be described below. However, materials, numerical conditions or the like of the respective components are simply shown as a preferred embodiment. Accordingly, the invention is not limited by the following embodiment but various modifications and deformation that can achieve the effects of the invention can be made without departing from the scope of the invention.

Prepositions, such as "on", "over" and "above" may be defined with respect to a surface, for example a layer surface, regardless of that surface's orientation in space. The preposition "above" may be used in the specification and claims even if a layer is in contact with another layer. The preposition "on" may be used in the specification and claims when a layer is not in contact with another layer, for example, when there is an intervening layer between them.

Experiment 1

Example 1

FIG. 1 is a schematic cross-sectional view showing a solid electrolytic capacitor according to Example 1. Anode 3 is formed by molding valve metal powder and sintering this molded body in vacuum. Anode lead terminal 2 is provided in side surface 3a of anode 3, so that a part of anode lead terminal 2 may be buried in anode 3.

Dielectric layer 4 formed of an oxide is formed on surfaces of anode 3 and a part of anode lead terminal 2. Since anode 3 is a porous body, dielectric layer 4 is also formed on the inner surface of the anode. Dielectric layer 4 is formed by anodization of anode 3.

Conducting polymer layer 5 is formed on dielectric layer 4. Conducting polymer layer 5 is also formed on dielectric layer 4 inside anode 3.

Carbon layer 6a and silver paste layer 6b are formed on conducting polymer layer 5 corresponding to outer circumferential surface 3b of anode 3. Carbon layer 6a is formed by applying a carbon paste. Silver paste layer 6b is formed by applying a silver paste. Cathode layer 6 is formed of carbon layer 6a and silver paste layer 6b.

As shown in FIG. 1, in this example, cathode layer 6 is formed so that a part of conducting polymer layer 5 may be exposed, the part of conducting polymer layer 5 being on side surface 3a of anode 3 and apart of corresponding outer circumferential surface 3b which continues from side surface 3a.

In this example, thermal expansion layer 10 is provided so as to entirely cover the exposed portion of conducting polymer layer 5 as described above. Thermal expansion layer 10 is formed by applying an epoxy resin containing a filler (silica).

Cathode layer 6 is connected to cathode lead frame 7 via conducting adhesive layer 9. In addition, anode lead terminal 2 is connected to anode lead frame 1. The solid electrolytic capacitor is formed in such a manner that an entire device is covered with resin outer package 8 formed of an epoxy resin composition so that end portions of cathode lead frame 7 and anode lead frame 1 may be exposed.

Specifically, the solid electrolytic capacitor of this example is manufactured by the following steps 1 to 4.

[Step 1]

Niobium metal powder with a mean primary particle diameter of approximately 0.5 μm is molded so that a part of an anode lead terminal may be buried therein. Then, the molded powder is sintered in vacuum so as to form anode 3 formed of the niobium porous sintered body approximately 4.4 mm high, approximately 3.3 mm wide, and approximately 1.0 mm deep.

The shape of anode 3 formed by the method above is a rectangular parallelepiped that has a side surface 3a buried anode lead terminal 2 therein, outer circumferential surface 3b continuing from the side surface 3a, and the other side surface opposite to side surface 3a.

[Step 2]

This anode 3 is subjected to anodization at a constant voltage of approximately 10 V for approximately 10 hours in approximately 0.1 weight % solution of ammonium fluoride which is kept at approximately 40° C. Subsequently, anode 3 is subjected to anodization at a constant voltage of approximately 10 V for approximately 2 hours in approximately 0.5 weight % solution of phosphoric acid which is kept at approximately 60° C., so that dielectric layer 4 containing fluorine is formed on surfaces of anode 3 and a part of anode lead terminal 2.

[Step 3]

Conducting polymer layer 5 which is mainly formed of polypyrrole is formed on the surface of dielectric layer 4 by a chemical polymerization method or the like. Subsequently, carbon layer 6a is formed on conducting polymer layer 5 on outer circumferential surface 3b of anode 3 by applying and drying a carbon paste. Silver paste layer 6b is formed on carbon layer 6a by applying and drying a silver paste. As shown in FIG. 1, cathode layer 6 formed of carbon layer 6a and silver paste layer 6b is not formed on side surface 3a of anode 3 and a part of outer circumferential surface 3b continuing from side surface 3a. Accordingly, conducting polymer layer 5 is in a state of being exposed on side surface 3a of anode 3 and outer circumferential surface 3b continuing from side surface 3a. Note that, anode 3 has a rectangular parallelepiped shape in this example, and thus outer circumferential surface 3b is formed of four surfaces. Moreover, cathode layer 6 is also formed on a side surface facing side surface 3a in which anode lead terminal 2 is buried. Cathode layer 6 is connected to cathode lead frame 7 via conducting adhesive layer 9. In addition, anode lead terminal 2 is connected to anode lead frame 1.

In this example, cathode layer 6 is formed so that conducting polymer layer 5 would be exposed on outer circumferential surface 3b in a degree of a half of a distance d (d/2) between an end surface of cathode lead frame 7 and conducting polymer layer 5 on side surface 3a. Note that, thermal expansion coefficient $\alpha 1$ of the silver paste layer in this example is $19 \times 10^{-6}$/° C.

[Step 4]

A liquid epoxy resin composition with thermal expansion coefficient $\alpha 1$ of $60 \times 10^{-6}$/° C., thermal expansion coefficient $\alpha 2$ of $120 \times 10^{-6}$/° C., and glass transition temperature (Tg) of 120° C., is applied so as to entirely cover a portion where conducting polymer layer 5 is exposed. Then, the resultant portion is subject to a thermal curing treatment at 100° C. for 30 minutes to thereby form thermal expansion layer 10. The epoxy resin composition forming thermal expansion layer 10 is prepared by adding 5 vol % of a silicone resin, which is a flexible material, and 50 vol % of silica, which is a filler, to 45 vol % of an epoxy resin with thermal expansion coefficient $\alpha 1$ of $90 \times 10^{-6}$/° C., thermal expansion coefficient $\alpha 2$ of $180 \times 10^{-6}$/° C., and glass transition temperature (Tg) of 80° C.

[Step 5]

After thermal expansion layer 10 is formed as described above, resin outer package 8 is formed around the device by a transfer molding method using a sealant containing an epoxy resin and an imidazole compound. Note that, thermal expansion coefficient $\alpha 1$ of the resin outer package in this example is $7 \times 10^{-6}$/° C.

[Measurement of Thermal Expansion Coefficients and Glass Transition Temperatures]

The thermal expansion coefficients and the glass transition temperatures are measured as follows. The thermal expansion coefficients and the glass transition temperatures are measured by a thermo-mechanical analysis method (TMA method). Here, TMA4000SA, which is a product of Bruker Axs Inc., is used for the TMA method. A specimen is manufactured so as to have a thickness of approximately 1.0 mm and a diameter of within 5 mm. At this time, the specimen is processed so as to be parallel in a thickness direction as much as possible. The specimen is set so as to measure the thickness direction, and then is heated so as to increase 10° C. per minute from room temperature by ratio. Then, a thermal expansion (contraction) amount in the thickness direction is measured. After that, a graph showing the temperature in the horizontal axis and the thermal expansion (contraction) amount in the longitudinal axis is made.

(i) Glass Transition Temperature

In the graph made as described above, a point where the thermal expansion amount is varied at the lowest temperature is set to be a glass transition temperature. In other words, a target line is drawn on the curve in each of anterior and posterior points of the varied point, and the intersection of these target lines is set to be a glass transition temperature.

(ii) Thermal Expansion Coefficient

In the above-described graph, thermal expansion coefficient $\alpha 1$ is calculated from the slope of the curve in a temperature range lower than the glass transition temperature. Note that, thermal expansion coefficient $\alpha 2$ can be obtained from the slope of the curve in a temperature range equal to or higher than the glass transition temperature.

Example 2

Figure 2:
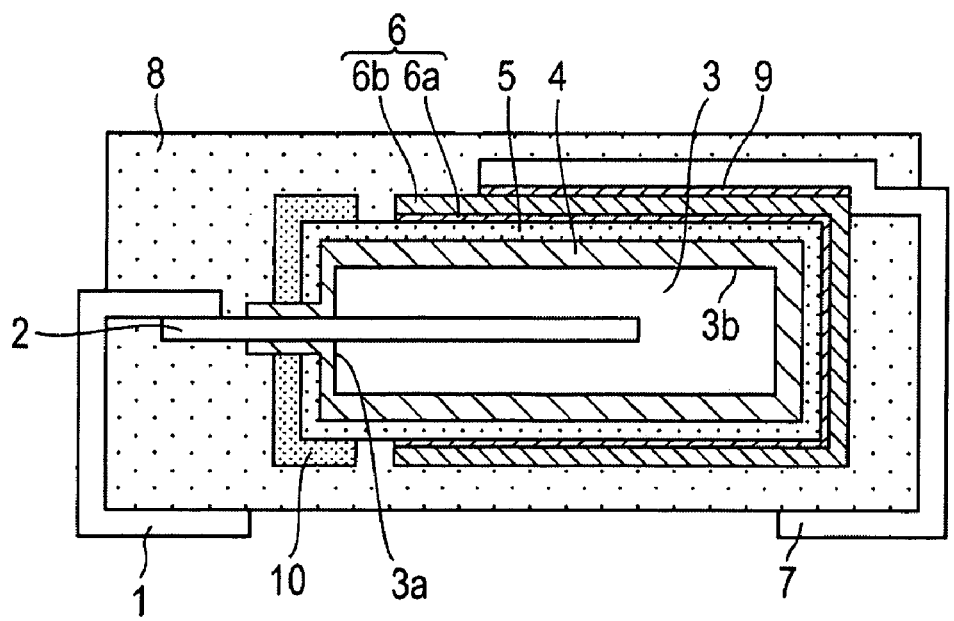
FIG. 2 is a schematic cross-sectional view showing a solid electrolytic capacitor according to Example 2.

FIG. 2 is a schematic cross-sectional view showing a solid electrolytic capacitor according to Example 2. In this example, as shown in FIG. 2, thermal expansion layer 10 is not formed so as to entirely cover the exposed portion of conducting polymer layer 5, but to cover a part of the exposed portion of conducting polymer layer 5 on the entire surface of side surface 3a of anode 3 and on a part of circumferential surface 3b continuing from side surface 3a. Accordingly, gaps are respectively formed between end portions of thermal expansion layer 10 and end portions of cathode layer 6 on outer circumferential surface 3b. A distance of each gap is formed so as to be approximately ⅕ of distance d shown in FIG. 1.

Example 3

Figure 3:
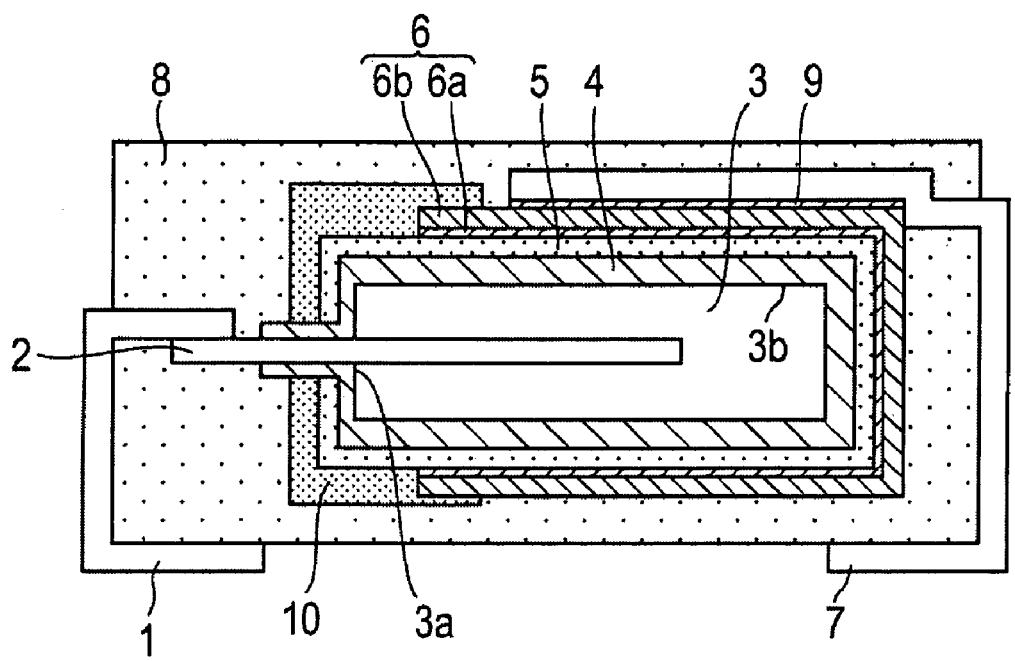
FIG. 3 is a schematic cross-sectional view showing a solid electrolytic capacitor according to Example 3.

FIG. 3 is a schematic cross-sectional view showing a solid electrolytic capacitor according to Example 3. In this example, on outer circumferential surface 3b of anode 3, thermal expansion layer 10 is formed so as to cover the end portions of cathode layer 6. The distance of the portion where thermal expansion layer 10 covers the end portions of cathode layer 6 is approximately ⅕ of distance d shown in FIG. 1.

Example 4

Figure 4:
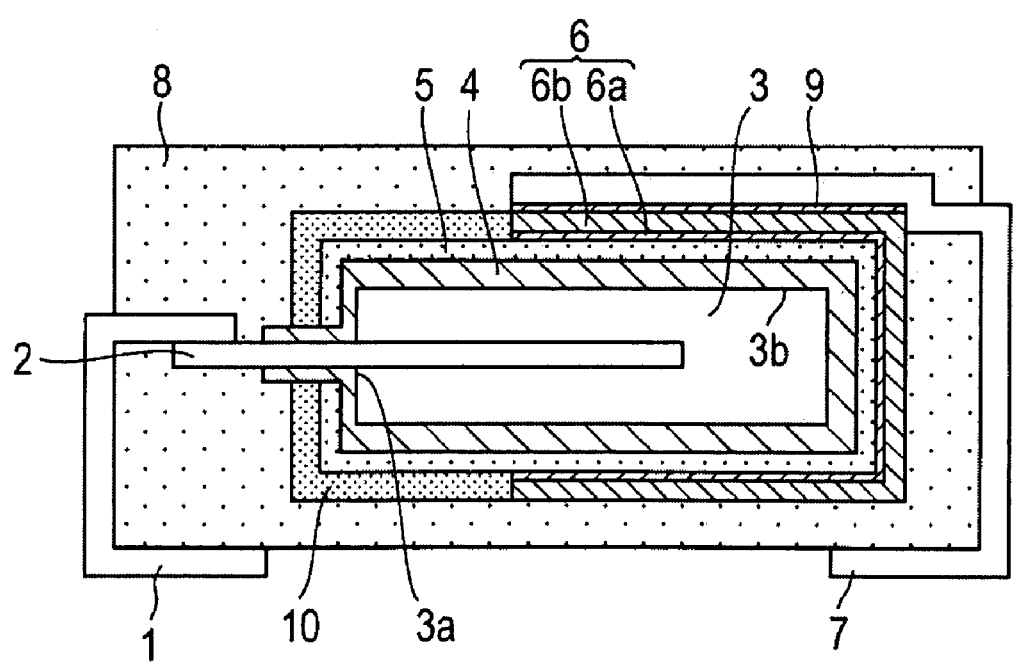
FIG. 4 is a schematic cross-sectional view showing a solid electrolytic capacitor according to Example 4.

FIG. 4 is a schematic cross-sectional view showing a solid electrolytic capacitor according to Example 4. In this example, cathode layer 6 is formed so that end portions of cathode layer 6 would be positioned in a position of an end portion of cathode lead frame 7. Accordingly, conducting polymer layer 5 is formed so as to be exposed on outer circumferential surface 3b in a portion corresponding to distance d shown in FIG. 1.

Thermal expansion layer 10 is formed so as to entirely cover the exposed portion of conducting polymer layer 5.

Comparative Example 1

Figure 5:
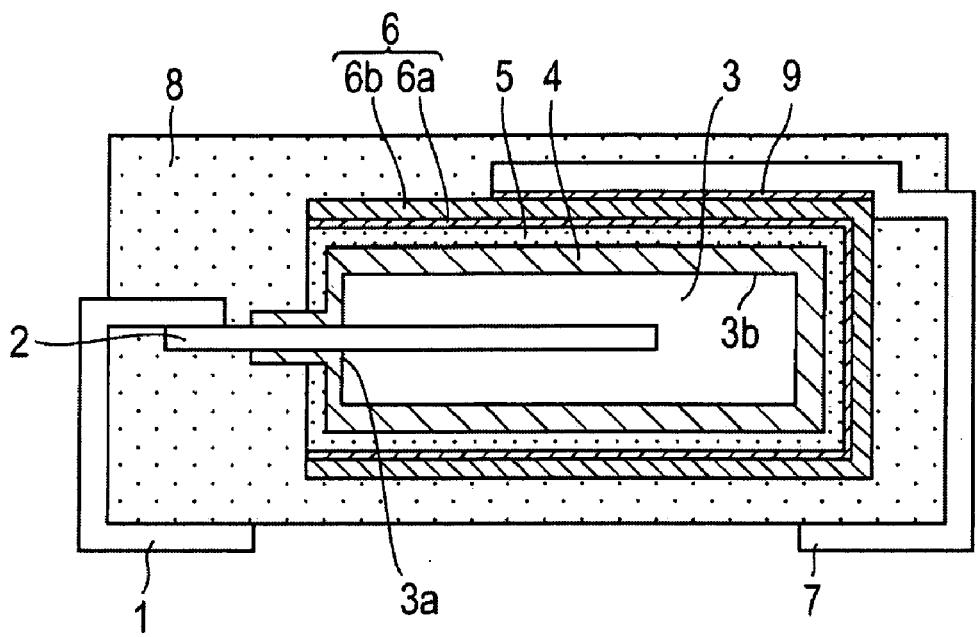
FIG. 5 is a schematic cross-sectional view showing a solid electrolytic capacitor according to Comparative Example 1.

FIG. 5 is a schematic cross-sectional view showing a solid electrolytic capacitor according to comparative example 1. In this comparative example, there is no portion where cathode layer 6 is not formed on outer circumferential surface 3b of anode 3. Accordingly, there is no portion where conducting polymer layer 5 is exposed on outer circumferential surface 3b, and the portion where conducting polymer layer 5 is exposed is only a portion corresponding to side surface 3a. In addition, in this comparative example, thermal expansion layer 10 is not formed.

Comparative Example 2

Figure 6:
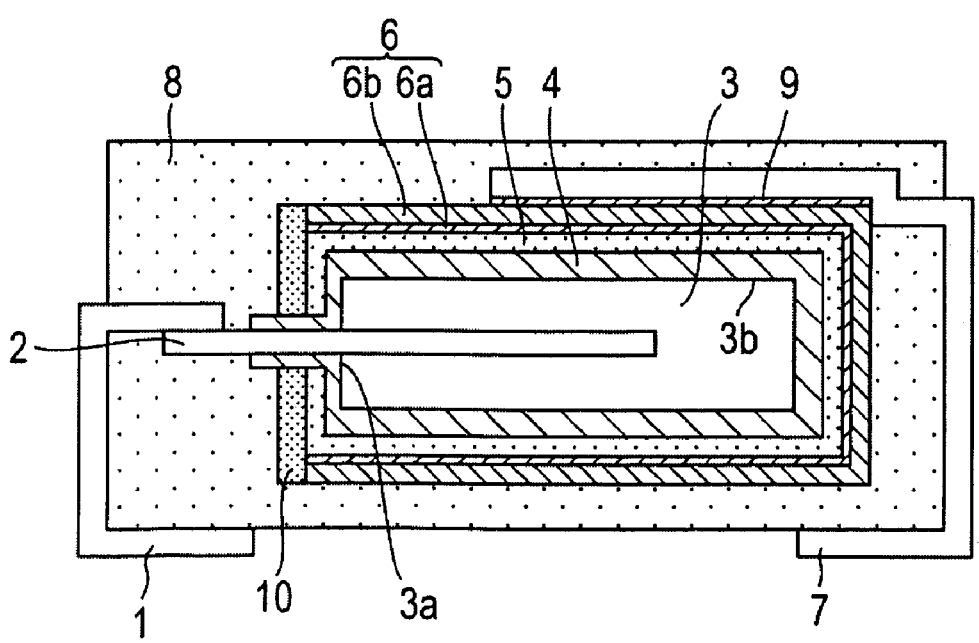
FIG. 6 is a schematic cross-sectional view showing a solid electrolytic capacitor according to Comparative Example 2.

FIG. 6 is a schematic cross-sectional view showing a solid electrolytic capacitor according to comparative example 2. In this comparative example, similar to comparative example 1, conducting polymer layer 5 is exposed only in the portion corresponding to side surface 3a. In addition, in this comparative example, thermal expansion layer 10 is formed in a portion where conducting polymer layer 5 is exposed. Accordingly, thermal expansion layer 10 is formed only in a portion corresponding to side surface 3a.

Comparative Example 3

Figure 7:
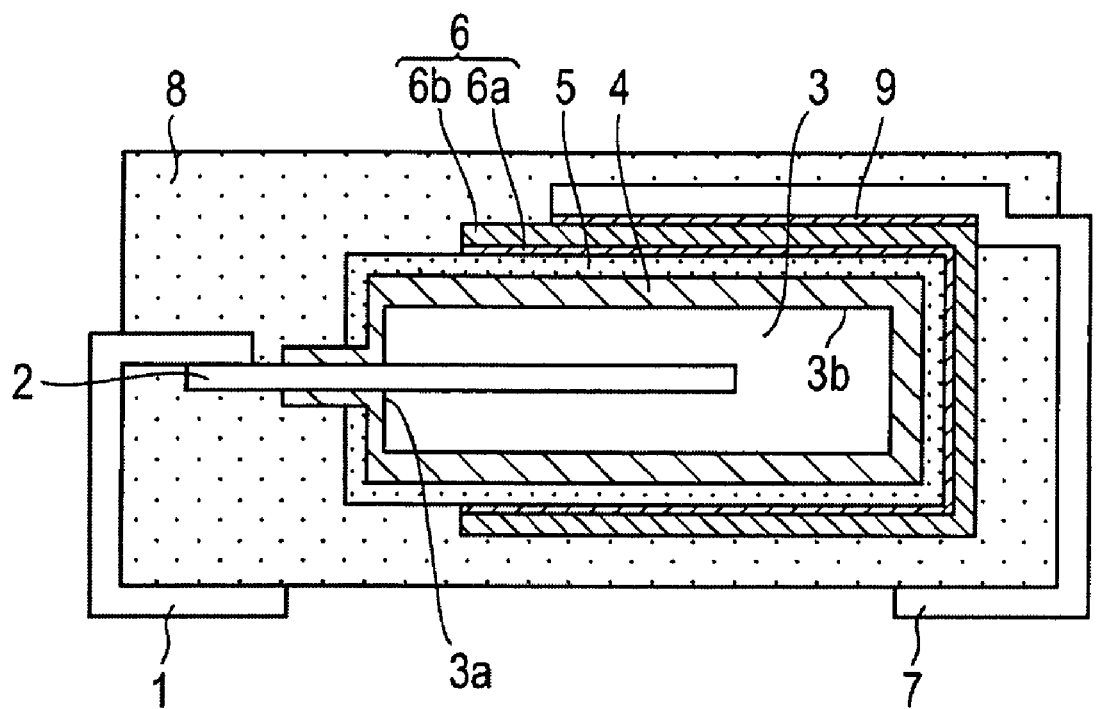
FIG. 7 is a schematic cross-sectional view showing a solid electrolytic capacitor according to Comparative Example 3.

FIG. 7 is a schematic cross-sectional view showing a solid electrolytic capacitor according to comparative example 3. In this example, similar to Example 1, the portion where conducting polymer layer 5 is exposed is formed in the portion corresponding to outer circumferential surface 3b but thermal expansion layer 10 is not provided.

[Reliability Test]

The reliability test is carried out for the solid electrolytic capacitors of Examples 1 to 4 and Comparative Examples 1 to 3. These solid electrolytic capacitors are left in a temperature-controlled bath, which is kept at 105° C., for 1000 hours. Capacitance of the solid electrolytic capacitors at a frequency of 120 Hz before and after the reliability test is measured by an LCR meter. The capacitance retention ratio is calculated by the following formula. Note that, the capacitance retention ration in the reliability test shows that a decrease in capacitance is smaller as this value is closer to 100. Table 1 shows measurement results.

Capacitance retention ratio (%)=(capacitance after reliability test/capacitance before reliability test× 100

TABLE 1

|  | Thermal expansion coefficient ($\times 10^{-6}$/° C.) | | Glass transition temperature (° C.) | Capacitance retention ratio (%) |
| --- | --- | --- | --- | --- |
|  | α1 | α2 | Tg |  |
| Example 1 | 60 | 120 | 120 | 94 |
| Example 2 | 60 | 120 | 120 | 88 |
| Example 3 | 60 | 120 | 120 | 93 |
| Example 4 | 60 | 120 | 120 | 96 |
| Comparative Example 1 | — | — | — | 58 |
| Comparative Example 2 | 60 | 120 | 120 | 63 |
| Comparative Example 3 | — | — | — | 59 |

As shown in Table 1, the solid electrolytic capacitors of Examples 1 to 4 according to the present invention have greatly improved capacitance retention ratios when compared to those of Comparative examples 1 to 3. Accordingly, it can be seen that provision of thermal expansion layer 10 enables: reducing stress caused along with contraction of the conducting polymer layer when the solid electrolytic capacitor is preserved under high temperature by expansion of the thermal expansion layer; preventing the conducting polymer layer from being separated from the dielectric layer; and thereby suppressing decrease in capacitance when the solid electrolytic capacitor is preserved under high temperature.

From the comparison between Examples 1 and 2, it can be seen that it is preferable to entirely cover the portion where the conducting polymer layer is exposed from a viewpoint of suppressing the decrease in capacitance. In addition, from the comparison between Examples 1 and 4, it can bee seen that the decrease in capacitance can be further suppressed by reducing the portion covered by the cathode layer as much as possible and covering the larger portion with the thermal expansion layer. However, when the region where the cathode layer is formed is excessively small in the outer circumferential surface of the anode, current collection characteristics is so decreased that equivalent series resistance (ESR) might be increased. In order not to greatly increase ESR, it is preferable that cathode layer 6 on outer circumferential surface 3b be formed so that the length thereof may be ½ or more of the length L shown in FIG. 1.

Experiment 2

Here, thermal expansion coefficient α1 (the thermal expansion coefficient in a temperature range lower than the glass transition temperature) and thermal expansion coefficient α2 (the thermal expansion coefficient in a temperature range equal to or higher than the glass transition temperature) of the epoxy resin composition forming the thermal expansion layer are changed. Then, an effect along with the change is studied.

The thermal expansion coefficient of the epoxy resin composition can be controlled by the content of filler (silica) in the resin composition. For example, when the content of filler is increased, the thermal expansion coefficient is decreased. In contrast, when the content of filler is decreased, the thermal expansion coefficient is increased. In the following Examples and comparative examples, thermal expansion coefficients $\alpha 1$ and $\alpha 2$ are adjusted by changing the content of filler.

Example 5

A solid electrolytic capacitor is manufactured in a similar manner to Example 1, except that a thermal expansion layer is formed by using an epoxy resin composition with thermal expansion coefficient $\alpha 1$ of $20 \times 10^{-6}/°$ C., thermal expansion coefficient $\alpha 2$ of $66 \times 10^{-6}/°$ C., and glass transition temperature (Tg) of 120° C.

Example 6

A solid electrolytic capacitor is manufactured in a similar manner to Example 1, excepting that a thermal expansion layer is formed by using an epoxy resin composition with thermal expansion coefficient $\alpha 1$ of $25 \times 10^{-6}/°$ C., thermal expansion coefficient $\alpha 2$ of $68 \times 10^{-6}/°$ C., and glass transition temperature (Tg) of 120° C.

Example 7

A solid electrolytic capacitor is manufactured in a similar manner to Example 1, excepting that a thermal expansion layer is formed by using an epoxy resin composition with thermal expansion coefficient $\alpha 1$ of $30 \times 10^{-6}/°$ C., thermal expansion coefficient $\alpha 2$ of $75 \times 10^{-6}/°$ C., and glass transition temperature (Tg) of 120° C.

Example 8

A solid electrolytic capacitor is manufactured in a similar manner to Example 1, except that a thermal expansion layer is formed by using an epoxy resin composition with thermal expansion coefficient $\alpha 1$ of $40 \times 10^{-6}/°$ C., thermal expansion coefficient $\alpha 2$ of $93 \times 10^{-6}/°$ C., and glass transition temperature (Tg) of 120° C.

Example 9

A solid electrolytic capacitor is manufactured in a similar manner to Example 1, except that a thermal expansion layer is formed by using an epoxy resin composition with thermal expansion coefficient $\alpha 1$ of $50 \times 10^{-6}/°$ C., thermal expansion coefficient $\alpha 2$ of $105 \times 10^{-6}/°$ C., and glass transition temperature (Tg) of 120° C.

Example 10

A solid electrolytic capacitor is manufactured in a similar manner to Example 1, except that a thermal expansion layer is formed by using an epoxy resin composition with thermal expansion coefficient $\alpha 1$ of $70 \times 10^{-6}/°$ C., thermal expansion coefficient $\alpha 2$ of $123 \times 10^{-6}/°$ C., and glass transition temperature (Tg) of 120° C.

Example 11

A solid electrolytic capacitor is manufactured in a similar manner to Example 1, except that a thermal expansion layer is formed by using an epoxy resin composition with thermal expansion coefficient $\alpha 1$ of $80 \times 10^{-6}/°$ C., thermal expansion coefficient $\alpha 2$ of $158 \times 10^{-6}/°$ C., and glass transition temperature (Tg) of 120° C.

Example 12

A solid electrolytic capacitor is manufactured in a similar manner to Example 1, except that a thermal expansion layer is formed by using an epoxy resin composition with thermal expansion coefficient $\alpha 1$ of $90 \times 10^{-6}/°$ C., thermal expansion coefficient $\alpha 2$ of $166 \times 10^{-6}/°$ C., and glass transition temperature (Tg) of 120° C.

Example 13

A solid electrolytic capacitor is manufactured in a similar manner to Example 1, except that a thermal expansion layer is formed by using an epoxy resin composition with thermal expansion coefficient $\alpha 1$ of $100 \times 10^{-6}/°$ C., thermal expansion coefficient $\alpha 2$ of $175 \times 10^{-6}/°$ C., and glass transition temperature (Tg) of 120° C.

Comparative Example 4

A solid electrolytic capacitor is manufactured in a similar manner to Example 1, except that a thermal expansion layer is formed by using an epoxy resin composition with thermal expansion coefficient $\alpha 1$ of $17 \times 10^{-6}/°$ C., thermal expansion coefficient $\alpha 2$ of $65 \times 10^{-6}/°$ C., and glass transition temperature (Tg) of 120° C.

Note that thermal expansion coefficient $\alpha 1$ of the thermal expansion layer in this comparative example is smaller than thermal expansion coefficient $\alpha 1$ ($19 \times 10^{-6}/°$ C.) of the silver paste layer.

[Reliability Test]

The reliability test is carried out for the solid electrolytic capacitors of Examples 5 to 13 and comparative example 4 in a similar manner to Experiment 1. The capacitance retention ratios thereof are shown in Table 2. Note that, the values of Example 1 are also shown in Table 2.

TABLE 2

|  | Thermal expansion coefficient ($\times 10^{-6}/°$ C.) | | Glass transition temperature (° C.) | Capacitance retention |
| --- | --- | --- | --- | --- |
|  | $\alpha 1$ | $\alpha 2$ | Tg | ratio (%) |
| Example 5 | 20 | 66 | 120 | 84 |
| Example 6 | 25 | 68 | 120 | 85 |
| Example 7 | 30 | 75 | 120 | 90 |
| Example 8 | 40 | 93 | 120 | 93 |
| Example 9 | 50 | 105 | 120 | 93 |
| Example 1 | 60 | 120 | 120 | 94 |
| Example 10 | 70 | 123 | 120 | 94 |
| Example 11 | 80 | 158 | 120 | 95 |
| Example 12 | 90 | 166 | 120 | 95 |
| Example 13 | 100 | 175 | 120 | 95 |
| Comparative Example 4 | 17 | 65 | 120 | 75 |

As shown in Table 2, an effect of the present invention can be obtained in a case where thermal expansion coefficient $\alpha 1$ of the thermal expansion layer is larger than thermal expansion coefficient $\alpha 1$ ($19 \times 10^{-6}/°$ C.) of the silver paste layer and thermal expansion coefficient $\alpha 1$ ($7 \times 10^{-6}/°$ C.) of the resin outer package. In particular, it can be seen that an effect of suppressing the decrease in capacitance becomes even larger when thermal expansion coefficient α1 is equal to or larger than 30×10$^{-6}$/° C. In addition, it can be seen that the decrease in capacitance can be further suppressed when thermal expansion coefficient α1 is equal to or larger than 60×10$^{-6}$/° C.

Note that, the largest value of thermal expansion coefficient α1 of the thermal expansion layer may be any value as long as a solid electrolytic capacitor is not broken by excessive expansion due to the thermal expansion layer when the solid electrolytic capacitor is preserved under high temperature (approximately 85° C. to 125° C.). For example, as described above, it is preferable that the largest value thereof be equal to or less than approximately 10000×10$^{-6}$/° C.

Experiment 3

Here, the glass transition temperature of the thermal expansion layer is changed. Then, an effect along with the change is studied. The glass transition temperature of the thermal expansion layer can be controlled by changing the content of a flexible material in the resin composition forming the thermal expansion layer. For example, the glass transition temperature becomes higher by increasing the content of the flexible material. In contrast, the glass transition temperature can be reduced by decreasing the content of the flexible material.

In the following examples, the glass transition temperature of the epoxy resin composition is changed by changing the content of the silicone resin which is a flexible material in the resin composition. Note that, the glass transition temperature of the epoxy resin composition mentioned here means a glass transition temperature of a hardened material of the epoxy resin composition.

Example 14

A solid electrolytic capacitor is manufactured in a similar manner to Example 1, except that a thermal expansion layer is formed by using an epoxy resin composition with thermal expansion coefficient α1 of 60×10$^{6}$/° C., thermal expansion coefficient α2 of 120×10$^{-6}$/° C., and glass transition temperature (Tg) of 80° C.

Example 15

A solid electrolytic capacitor is manufactured in a similar manner to Example 1, except that a thermal expansion layer is formed by using an epoxy resin composition with thermal expansion coefficient α1 of 60×10$^{-6}$/° C., thermal expansion coefficient α2 of 120×10$^{-6}$/° C., and glass transition temperature (Tg) of 90° C.

Example 16

A solid electrolytic capacitor is manufactured in a similar manner to Example 1, except that a thermal expansion layer is formed by using an epoxy resin composition with thermal expansion coefficient α1 of 60×10$^{-6}$/° C., thermal expansion coefficient α2 of 120×10$^{-6}$/° C., and glass transition temperature (Tg) of 95° C.

Example 17

A solid electrolytic capacitor is manufactured in a similar manner to Example 1, except that a thermal expansion layer is formed by using an epoxy resin composition with thermal expansion coefficient α1 of 60×10$^{-6}$/° C., thermal expansion coefficient α2 of 120×10$^{-6}$/° C., and glass transition temperature (Tg) of 110° C.

Example 18

A solid electrolytic capacitor is manufactured in a similar manner to Example 1, except that a thermal expansion layer is formed by using an epoxy resin composition with thermal expansion coefficient α1 of 60×10$^{-6}$/° C., thermal expansion coefficient α2 of 120×10$^{-6}$/° C., and glass transition temperature (Tg) of 130° C.

[Reliability Test]

The reliability test is carried out for the solid electrolytic capacitors of Examples 14 to 18. The capacitance retention ratios are shown in Table 3. Note that, the values of Example 1 are also shown in Table 3.

TABLE 3

| | Thermal expansion coefficient (×10$^{-6}$/° C.) | | Glass transition temperature (° C.) | Capacitance retention |
|---|---|---|---|---|
| | α1 | α2 | Tg | ratio (%) |
| Example 14 | 60 | 120 | 80 | 97 |
| Example 15 | 60 | 120 | 90 | 98 |
| Example 16 | 60 | 120 | 95 | 98 |
| Example 17 | 60 | 120 | 110 | 93 |
| Example 1 | 60 | 120 | 120 | 94 |
| Example 18 | 60 | 120 | 130 | 93 |

As is clear from the results shown in Table 3, the capacitance retention ratios become high by setting the glass transition temperature of the epoxy resin composition forming the thermal expansion layer to be equal to or less than 100° C. Accordingly, it can be seen that the glass transition temperature of the thermal expansion layer is preferably equal to or less than 100° C. Note that, it is preferable that the smallest value of the glass transition temperature of the thermal expansion layer be equal to or higher than 40° C., and more preferably, equal to or higher than 70° C.

As has been described above, the solid electrolytic capacitor of this embodiment is capable of suppressing decrease in capacitance when preserved under high temperature.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

What is claimed is:

1. A solid electrolytic capacitor, comprising:
   an anode which is mainly formed of at least one of a valve metal and an alloy thereof;
   an anode lead terminal a part of which is buried in a side surface of the anode;
   a dielectric layer that is formed on surfaces of the anode and is mainly formed of an oxide;
   a conducting polymer layer that is formed on the dielectric layer;
   a cathode layer that is formed on the conducting polymer layer corresponding to an outer circumferential surface of the anode, the cathode layer comprising:
a carbon layer; and
a silver paste layer that is formed on the carbon layer;
a thermal expansion layer that is provided on the side surface of the anode as well as on the conducting polymer layer corresponding to a part of the outer circumferential surface continuing from the side surface; and
a resin outer package provided so as to cover the anode, the dielectric layer, the cathode layer, and the thermal expansion layer, wherein
a thermal expansion coefficient in a temperature range lower than a glass transition temperature of the thermal expansion layer is larger than a thermal expansion coefficient in a temperature range lower than a glass transition temperature of each of the silver paste layer and the resin outer package, and wherein
the resin outer package is disposed between the anode lead terminal and the thermal expansion layer as well as between the cathode lead terminal and the thermal expansion layer, and the anode lead terminal and the cathode lead terminal are not in contact with the thermal expansion layer.

2. The capacitor of claim 1, wherein the cathode layer is provided so that a portion of the conductive polymer layer corresponding to the part of the outer circumferential surface of the anode is exposed, and
the thermal expansion layer is in contact with the exposed portion of the conductive polymer layer.

3. The capacitor of claim 2, wherein the cathode layer is in contact with the thermal expansion layer.

4. The capacitor of claim 2, wherein the thermal expansion layer is provided so as to entirely cover the exposed portion.

5. The capacitor of claim 2, wherein the thermal expansion layer is provided so as to cover a part of the exposed portion, and a portion of the conductive polymer layer corresponding to the part of the outer circumferential surface of the anode is in contact with the resin outer package.

6. The capacitor of claim 2, wherein the thermal expansion layer is provided so as to cover end portions of the cathode layer.

7. The capacitor of claim 1, further comprising
a cathode lead frame which is electrically connected to the cathode layer, wherein
the cathode lead frame is provided so that end portions of the cathode layer are positioned at an end portion of the cathode lead frame.

8. The capacitor of claim 1, wherein the thermal expansion coefficient in the temperature range lower than the glass transition temperature of the thermal expansion layer is not less than $30 \times 10^{-6}/°$ C.

9. The capacitor of claim 1, wherein the thermal expansion coefficient in the temperature range lower than the glass transition temperature of the thermal expansion layer is not more than $10000 \times 10^{-6}/°$ C.

10. The capacitor of claim 1, wherein the glass transition temperature of the thermal expansion layer is not more than $100°$ C.

11. The capacitor of claim 1, wherein the thermal expansion layer contains a resin.

12. The capacitor of claim 11, wherein the resin includes at least one resin selected from an epoxy resin, a silicone resin, a urethane resin, and a fluorine resin.

13. The capacitor of claim 11, wherein the resin includes a filler.

14. The capacitor of claim 13, wherein the filler contains any one of silica and alumina.

* * * * *